Patented May 2, 1933

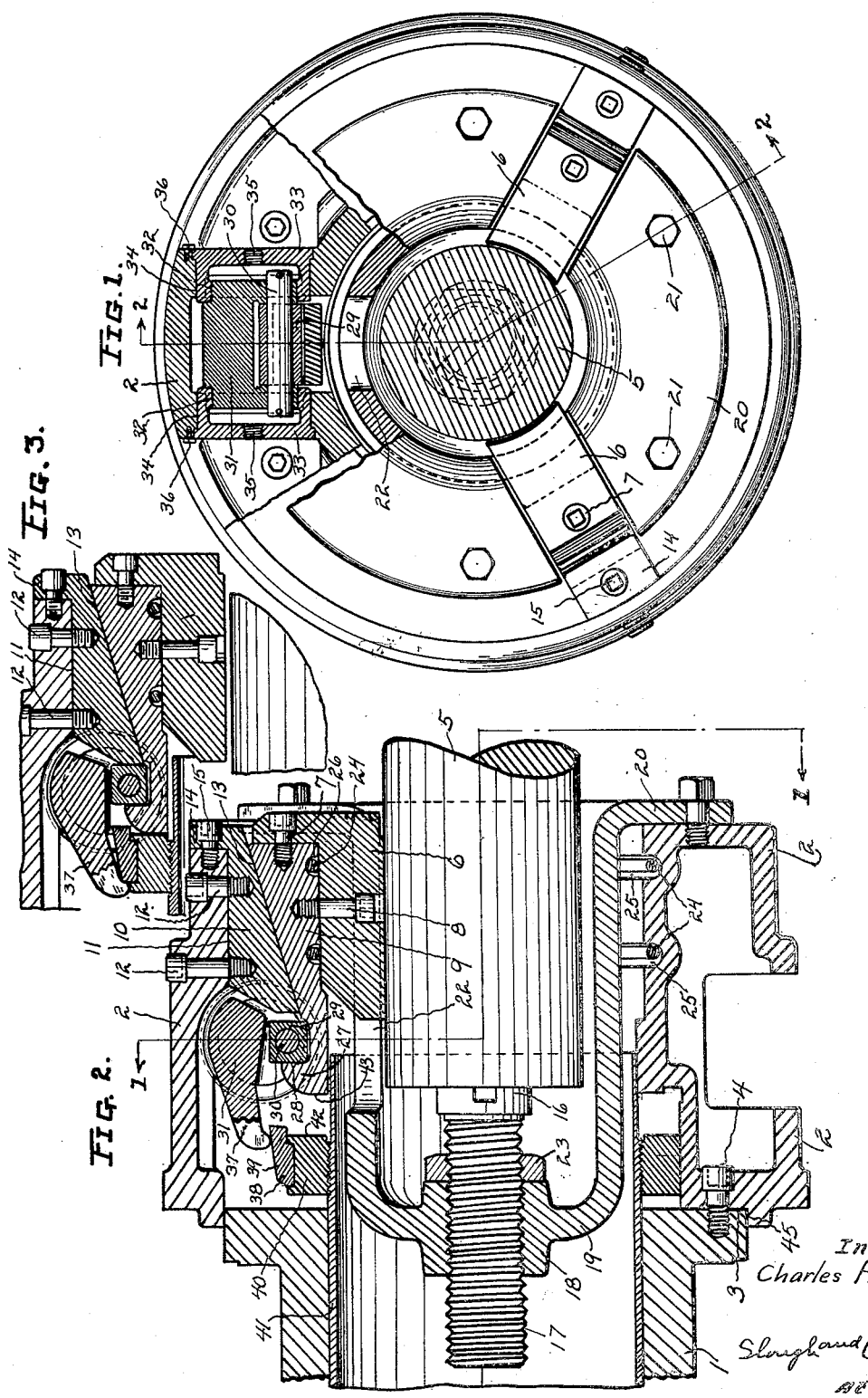

1,906,424

UNITED STATES PATENT OFFICE

CHARLES H. SCHURR, OF CLEVELAND, OHIO, ASSIGNOR TO THE LEES-BRADNER COMPANY, OF CLEVELAND, OHIO, A CORPORATION OF OHIO

CHUCK

Application filed January 2, 1930. Serial No. 417,847.

This invention relates to chucks and particularly to chucks of the type adapted for use on machine tools.

Heretofore, one of the difficulties encountered in machine tool chucks has been the rapid deterioration of the parts by which the work piece is held rigidly and accurately in the chuck. Upon continued use of former types of chuck, particularly when built in large sizes, the parts which actuate the chuck jaws, to exert their gripping action rapidly wear and rapidly develop inaccuracies.

Furthermore, in such chucks, the parts such as the jaws which exert radial gripping force usually overhang axially the parts which actuate them and are therefore given a tendency to spring or yield when exerting great gripping force.

It is, therefore, one of the objects of this invention to provide a chuck for machine tools, the gripping jaws of which may be operated in a manner to transmit the reactions of their gripping force directly into the rigid encircling main body or frame of the chuck, whereby they may have the maximum possible rigidity.

Another object is to provide a chuck in which the maximum of gripping force may be exerted on the jaws by the minimum of operating force exerted by the jaw operating mechanism, whereby the wear of the mechanism and its parts may be reduced to the minimum.

Another object is to provide a chuck adapted to be operated by the thrust of a piston-rod-like element associated with a hydraulic or pneumatic piston.

Another object is to provide a chuck in which the operative parts may be enclosed and thoroughly lubricated and protected from dust, metal chips and the like.

Other objects will be apparent to those skilled in the art to which my invention pertains.

My invention is fully disclosed in the following description taken in connection with the accompanying drawing, in which:—

Fig. 1 is a front elevational view partly in section, the sectional part being taken approximately from the plane 1—1 of Fig. 2, of a chuck of my invention and a work piece secured therein;

Fig. 2 is a longitudinal sectional view of the chuck of Fig. 1 taken approximately from the plane 2—2 of Fig. 1;

Fig. 3 is a fragmentary view similar to Fig. 2 with the parts in different positions.

Referring to Fig. 2, I have shown at 1 the hollow rotary work spindle of a machine tool with which the chuck of my invention is adapted to be employed. At 2 I have shown the main frame or enclosing housing of the chuck having an annular shoulder 45 and face 3 by which it is adapted to be coaxially aligned with and secured upon the work spindle 1, bolts 4 being provided to securely mount it on the work spindle for rotation therewith.

The work piece 5 shown in Figs. 1 and 2 may be gripped by the chuck by three similar chuck jaws 6, 6, 6 disposed around the chuck approximately 120° apart. The mechanism for operating the chuck jaws 6 to move them radially to engage and disengage the work piece 5 is similar for each of the jaws. One of them is shown in cross-section in the drawing, and will be described.

The jaw 6 is generally of L-shape, as shown in Fig. 2 having legs extending radially and axially of the chuck and bolted by bolts 7 and 8 to a movable wedge 9. Cooperating with the movable wedge 9 is a stationary wedge 10 bolted internally of the main frame 2 of the chuck by bolts 12—12. The movable and stationary wedges 9 and 10 engage each other mutually on a plane 13 which is inclined toward the axis of the chuck. By means to be described, it will therefore be understood that when the movable wedge 9 is moved axially, say toward the left as viewed in Fig. 2, its reaction upon the stationary wedge 10 will give it a component of movement radially toward the axis of the chuck and this movement communicated to the jaw 6 will move it radially toward the axis. A similar movement is given to the other jaws 6 concurrently and the work piece 5 is gripped by the jaws in consequence.

It will be noted that the stationary wedge 10 is rigidly secured or backed up against and rendered unyielding under the strain imposed on it during the above described wedging action by being mounted on the inside of a generally cylindrical portion 11 of the housing 2 and is prevented from shifting axially by the bolts 12 above referred to and also by the provision of an integral radially disposed branch or leg 14 of the wedge 10 overlapping the front annular edge of the cylindrical portion 11 and bolted thereto by a bolt 15.

During the above referred to movement of the wedge 9 and the jaw 6 secured thereto, the jaw 6 not only has a radial movement toward the axis of the chuck, but a component of movement in the axial direction. In cases in which it is not desirable that the axial movement of the jaw 6 shall be communicated to the work piece 5, means is provided to prevent the work piece 5 from moving axially. Various means may be employed for this purpose. The means shown in the drawing comprises a stop 16 having an axially directed threaded extension 17 screw-threaded into the bottom 18 of a generally axially disposed cup-shaped bracket 19, the outer or open end of which terminates in a radially directed flange 20 bolted by bolts 21 to the end face of the housing 2. In the side wall of the cup-shaped bracket 19 suitable axially disposed elongated recesses 22 are provided to straddle the jaws 6; or in other words, to permit the jaws 6 to be operated in and through the wall of the cup-shaped bracket 19. The head 16 may be axially adjusted by the thread portion 17 and locked in adjusted position by a lock nut 23 all of which may be operated from a position in front of the chuck through the axial opening therein.

Upon retraction of the wedge 9, axially by the mechanism to be described, the outward radial movement of the wedge 9 and jaws 6 is insured by the provision of one or more outwardly expanding resilient annular split rings or springs 24, mounted in suitable annular recesses 25 in the housing 2 and suitable notches or recesses 26 in the wedge 9.

The mechanism for moving the movable wedge 9 will now be described. On the wedge is provided a hook 27 having a face 28 in a plane at right angles to the chuck axis. A block 29 having a face adapted to lie coincident with the face 28 is rotatably mounted on a transverse pin 30. The pin 30 projects through the block 29 and at its ends is supported in bearings in a rotatable barrel 31. The axis of the pin 30 is eccentric with respect to the rotational axis of the barrel 31, so that rotation of the barrel 31 will give to the pin 30, as viewed in Fig. 2, movement on a circular arc around the axis of the barrel 31, but with large components of movement in horizontal right hand and left hand directions.

The barrel 31 has reduced cylindrical portions 32—32 on the opposite ends thereof which are rotatably supported in cup-like bearing supports 33—33. The bearing supports 33 are mounted in cylindrical bores 34—34 in the main housing 2 of the chuck. In the bottoms of the cup-like bearing supports 33, screw-threaded perforations 35 are provided for the reception of lubricant injecting devices and the supports 33 may be retained axially in their bores by the heads of retaining screws 36—36.

Mounted on or formed with the barrel 31 is an arm or cam follower 37 by means of which the barrel 31 is adapted to be rotated clockwise as viewed in Fig. 2. To rotate it, a cam 38 having an inclined camming surface 39 is secured to a cam carrier 40, which in the preferred form of my invention is an annular ring internally screw-threaded to adapt it to be rigidly secured to a tube 41 extending axially through the work spindle 1. By means, not shown, but which will be understood to those skilled in the art, the tube 41 may be actuated to move it axially, one type of means being a pneumatic or hydraulic piston and cylinder.

The annular cam support 40 is also provided with a face 42 adapted to abuttingly engage a face 43 on the hook 27 of the movable wedge 9 for a purpose to be described. In the operation, therefore, of the mechanism above described, when it is desired to operate the chuck to grip the work piece 5, the tube 41 is propelled toward the left as viewed in Fig. 2 by pneumatic or other means, not shown. This movement communicated to the cam carrier 40 and cams 38 causes the inclined surface 39 of the cam to raise the cam follower 37 thus rotating the barrel 31 clockwise as viewed in Fig. 2 and giving to the pin 30 and block 29 movement toward the left. The movement of the block, in engagement with the hook 27, gives a thrust axially toward the left to the wedge 9 and moves it and this movement, as above described, causes the jaws 6 to grip the work piece 5. During the arcuate movement of the block 29, it has sliding movement on the face 28 of the hook 27 transversely or radially with respect to the chuck axis.

To release the chuck jaws 6 from the work piece 5, the tube 41 is given a movement toward the right in Fig. 2. The corresponding movement of the cam support 40 toward the right releases the pressure of the cam face 39 from the cam follower 37 releasing the pressure from the chuck jaws 6. Continued movement of the cam support 40 will bring it to the position shown in Fig. 3, where, as will be seen, not only is the cam 38 removed from positions to actuate the cam follower 37, but also the face 42 of the cam support 40 comes into abutting engagement with the face 43 of the hook 27 so that if, due to the friction or wedging action of the movable and stationary wedges 9 and 10, one upon the other, and/or due to the gripping engagement of the jaws 6 with the work piece 5, the wedge 9 does not tend to slide outwardly on the wedge 10, the pressure on the face 43 will force the wedge 9 to the right, as viewed in Fig. 2 to relieve said gripping action and force the parts into the position shown in Fig. 3. Concurrently, the annular split springs 24 cause the chuck jaws 6 to release the work piece 5.

By means of the foregoing construction, it will be observed that the gripping force is produced by the inclined plane of the wedges 9 and 10 and by the inclined plane of the cam 38 which arrangement as is well understood will give the maximum of gripping pressure with the maximum of pressure on the engaged wearing parts. Also, it will be observed that the entire mechanism of the chuck is enclosed within the cylindrical portion 11 of the housing 2, which permits thorough lubrication of the same and at the same time provides protection from the entrance of dirt, metal chips, etc.

My invention is not limited to the exact details of construction shown and described. Many changes and modifications may be made therein within the spirit of my invention without sacrificing its advantages.

I claim:

1. A chuck having a main frame provided with internal inclined surfaces, a plurality of radially and axially movable gripping jaws each having an external inclined surface adapted to slide upon one of the inclined surfaces of the frame, resilient means urging said jaws to their outermost position, levers journalled in said frame and arranged to move the jaws to their innermost position, an axially movable member extending to within the frame and arranged to actuate said levers when moved in one direction and having a part in alinement with and arranged to move the jaws to extended position when moved in the other direction.

2. A chuck having a main frame provided with a plurality of inclined surfaces on its interior, a plurality of gripping jaws each having an inclined surface adapted to slide upon one of said inclined surfaces of the frame, a crank shaft journalled within the frame adjacent each jaw, the crank being arranged to move the jaw in a direction to wedge it upon a work piece, a lever carried by said crank shaft, an axially movable element extending within a casing, cam surfaces carried by said element and arranged to move said arms when the element is moved in one direction, and abutments carried by said member adapted to abut the jaws and move them toward releasing position when the element is moved in the other direction.

3. A chuck comprising an outer casing having inclined surfaces on its interior, a plurality of gripping jaws each having an inclined surface on its exterior adapted to slide upon one of said inclined surfaces of the casing, a crank shaft journalled in the casing adjacent each jaw and having a crank provided with a bearing block adapted to move the jaw in one direction, an arm fixed to said crank shaft, an axially movable actuator extending into said casing, and a ring carried by said actuator and provided on its exterior with cam surfaces engaging the ends of said arms, the ring being movable to bear against the end of the jaws and move these in one direction.

4. A chuck comprising an outer casing having inclined surfaces on its interior, a plurality of gripping jaws each having an inclined surface on its exterior adapted to slide upon one of said inclined surfaces of the casing, a crank shaft journalled in the casing adjacent each jaw and having a crank provided with a bearing block adapted to move the jaw in one direction, an arm fixed to said crank shaft, an axially movable actuator extending into said casing, a ring carried by said actuator and provided on its exterior with cam surfaces engaging the ends of said arms, the ring being movable to bear against the end of the jaws and move these in one direction, and a resilient ring urging said jaws outwardly.

5. A chuck comprising an outer casing having inclined surfaces on its interior, a plurality of gripping jaws each having an inclined surface on its exterior adapted to slide upon one of said inclined surfaces of the casing, a crank shaft having an arm journalled in the casing adjacent each jaw and having a crank provided with a bearing block adapted to move the jaw in one direction, the ends of the crank shaft being formed into trunnions, cup-shaped bushings supporting said trunnions and insertable into chordally extending bores in said housing, means for supplying lubricant through said bushings to said trunnions, an axially movable actuator extending into said casing, a ring carried by said actuator and provided on its exterior with cam surfaces engaging the ends of said arms, the ring being movable to bear against the end of the jaws and move these in one direction, and a resilient ring urging said jaws outwardly.

In testimony whereof I hereunto affix my signature this 31st day of December, 1929.

CHARLES H. SCHURR.